United States Patent [19]

Riel

[11] Patent Number: 4,465,725
[45] Date of Patent: Aug. 14, 1984

[54] NOISE SUPPRESSION PANEL

[75] Inventor: Frank J. Riel, San Diego, Calif.

[73] Assignee: Rohr Industries, Inc., Chula Vista, Calif.

[21] Appl. No.: 398,662

[22] Filed: Jul. 15, 1982

[51] Int. Cl.$^3$ .............................................. B32B 3/12
[52] U.S. Cl. ..................................... 428/116; 52/806; 181/292; 428/138
[58] Field of Search .......................... 52/806; 181/292; 156/197, 292; 428/73, 116, 117, 118, 138, 593

[56] References Cited

U.S. PATENT DOCUMENTS

| | | | |
|---|---|---|---|
| 2,952,579 | 9/1960 | Merriman | 428/118 |
| 3,166,149 | 1/1965 | Hulse et al. | 428/118 X |
| 3,284,274 | 11/1966 | Huslander et al. | 428/116 X |
| 4,111,081 | 9/1978 | Hilliard et al. | 428/116 X |
| 4,254,171 | 3/1981 | Beggs et al. | 428/116 |
| 4,269,882 | 5/1981 | Carrillo et al. | 428/116 |
| 4,271,219 | 6/1981 | Brown | 428/116 |
| 4,291,079 | 9/1981 | Hom | 428/116 |
| 4,292,356 | 9/1981 | Whitemore et al. | 428/116 |
| 4,294,329 | 10/1981 | Rose et al. | 428/116 X |

Primary Examiner—Henry F. Epstein
Attorney, Agent, or Firm—Patrick J. Schlesinger; Frank D. Gilliam

[57] ABSTRACT

A noise suppression panel having a first cellular core positioned between and bonded to an imperforate facing sheet on one surface thereof and a first sheet of microporous material on the other surface. A second core is bonded between the other surface of the first sheet of microporous material and a perforated sheet. The other surface of the perforated sheet has a second sheet of microporous material bonded thereto. The cells of the two cores are preferably substantially aligned when maximum core-to-core bonding strength therebetween is required. A method of manufacturing is disclosed which includes flow-through resistance testing of the subassemblies.

14 Claims, 12 Drawing Figures

FLOW CHART  FIG. II a) CLEANING  b) DEGREASING AND  c) PRIMER APPLICATION

↓

APPLYING A SOLVENT BASE FIRST ADHESIVE TO ONE SIDE OF THE PERFORATED PART;

↓

REMOVING THE SOLVENT FROM THE FIRST SOLVENT BASE ADHESIVE;

↓

STACKING THE PERFORATED SHEET AND A FIRST SHEET OF MICROPOROUS MATERIAL ADJACENT THE ADHESIVE COATED SURFACE THEREOF, APPLYING A POSITIVE PRESSURE TOWARD THE CENTER OF THE COMPONENTS AND CURING THE ADHESIVE;

↓

APPLYING A COATING OF MASKANT TO THE PERFORATION EXPOSED SURFACE OF THE COMBINED PERFORATED SHEET AND MICROPOROUS MATERIAL;

↓

APPLYING A NON-WETTING SOLUTION TO THE FIBERS OF THE MICROPOROUS MATERIAL AND THE ADJACENT ATTACHED SURFACE OF THE PERFORATED SHEET;

↓

REMOVING THE MASKANT COATING;

↓

APPLYING A SECOND ADHESIVE TO ONE FAYING EDGE SURFACE OF EACH OF THE TWO HONEYCOMB CORES;

↓

APPLYING A NON-WETTING SOLUTION TO THE FIBERS OF THE SECOND SHEET OF MICROPOROUS MATERIAL;

↓

STACKING THE HONEYCOMB CORES WITH A SECOND SHEET OF MICROPOROUS MATERIAL SANDWICHED BETWEEN THE COATED SURFACES OF THE HONEYCOMB CORES, APPLYING A POSITIVE PRESSURE TOWARD THE CENTER OF THE COMPONENTS AND CURING THE ADHESIVE;

↓

TESTING THE FLOW-THROUGH RESISTANCE OF (1) THE COMBINED AND CURED PERFORATED SHEET AND FIRST SHEET OF MICROPOROUS MATERIAL, AND (2) THE HONEYCOMB CORES AND SECOND SHEET OF MICROPOROUS MATERIAL;

↓

APPLYING A LAYER OF THE SECOND ADHESIVE BETWEEN ONE HONEYCOMB CORE'S OPEN-CELL SURFACE AND THE IMPERFORATE SHEET AND BETWEEN THE OTHER HONEYCOMB CORE'S OPEN-CELL SURFACE AND THE PERFORATION EXPOSED SURFACE OF THE PERFORATED SHEET;

↓

STACKING THE VARIOUS COMPONENTS IN THE FOLLOWING SEQUENCE: FIRST, THE IMPERFORATE SHEET, THEN ONE OPEN-CELL SURFACE OF THE COMBINED HONEYCOMB CORES AND SECOND LAYER OF POROUS MATERIAL, THEN THE COMBINED PERFORATED SHEET AND FIRST SHEET OF MICROPOROUS MATERIAL WITH THE PERFORATION EXPOSED SURFACE ADJACENT THE OPEN-CELL SURFACE OF THE OTHER HONEYCOMB CORE, APPLYING A POSITIVE PRESSURE BETWEEN THE OUTER SURFACES TOWARD THE CENTER, AND CURING THE SECOND ADHESIVE.

NOISE SUPPRESSION PANEL

BACKGROUND OF THE INVENTION

This invention relates generally to a noise suppression panel, and more particularly, but not by way of limitation, to a sandwich structure having a first imperforate facing sheet adhered to one surface of a first honeycomb core, a sheet of microporous material adhered to the other surface of the first honeycomb core, one surface of a second honeycomb core is adhered to the other surface of the first sheet of microporous material and its other surface is adhered to a perforated facing sheet with a second sheet of microporous material adhered to the opposite surface of the perforated sheet.

In the manufacture of sound suppression materials of this general type which are to be exposed to an extreme environment and to the sound produced by modern turbine aircraft engines, it is a common practice to provide a cellular structure utilizing the Helmholtz resonator principle. Examples of this type of material can be found in U.S. Pat. Nos. 2,952,579; 3,166,149; 4,111,081; 4,254,171; 4,269,882; 4,291,079; and 4,292,356. Examples of sound suppression panels utilizing double cellular structures can be found in U.S. Pat. Nos. 4,271,219 and 4,294,329.

The latter two examples work successfully but because of their method and materials of construction are costly to produce and have substantial weight.

The present invention provides an improved sound suppression panel with structural integrity and the capability of withstanding severe environmental conditions such as those encountered in and around modern turbine engines and is relatively inexpensive to construct and light in weight.

SUMMARY OF THE INVENTION

Briefly stated, the invention consists of a sound suppression panel utilizing the Helmholtz resonator principle, which consists of a sandwich structure layered as follows: A first layer of an imperforate facing sheet constructed of suitable material for the purpose intended, generally aluminum or the like; a first cellular core adhered to the imperforate sheet so that the imperforate sheet forms a closure on one open cell surface thereof; a first sheet of microporous material is adhered to the first core opposite the imperforate sheet; one open cell surface of a second cellular core is adhered to the first sheet of microporous material on its surface opposite the first core attachment, and a sheet of perforated material is adhered to the side of the second core opposite the first sheet of microporous material; and a second sheet of microporous material is adhered to the opposite side of the perforated sheet.

The cores can be constructed of any suitable material such as aluminum when the first sheet of microporous material is non-metallic and from a non-metallic material, such as phenolic epoxy impregnated fiberglass, Nylon ® polyamide, Nomex ® polyamide or the like when a steel wire mesh is used for the first sheet of microporous fibrous material. Aluminum cores may be used, with the first sheet of microporous material constructed of steel, by isolating the cores from the steel layer by an adhesive barrier or other isolation means.

The outer or second sheet of microporous fibrous material may be of the same material as the first sheet, which is generally a woven wire mesh, that is attached and isolated from the perforated sheet, generally constructed of aluminum as taught by aforementioned U.S. Pat. Nos. 4,254,171 and 4,291,079.

It is an object of this invention to provide a lightweight, highly linear sound suppression panel having structural integrity for noise attenuation in severe environments.

A further object of this invention is to provide a sound suppression panel constructed of isolated, adjacent, dissimilar materials.

A further object of this invention is to provide a relatively inexpensive method of sound suppression panel construction.

A still further object of this invention is to provide sub-assemblies which can be tested individually prior to final assembly.

These and other objects and advantages of the invention will become better understood by reference to the following detailed description, when considered with the drawing figures, in which:

BRIEF DESCRIPTION OF THE DRAWINGS

FIG. 11 is a simplified flow chart of the method of manufacture.

DETAILED DESCRIPTION OF THE INVENTION

Figure 1:
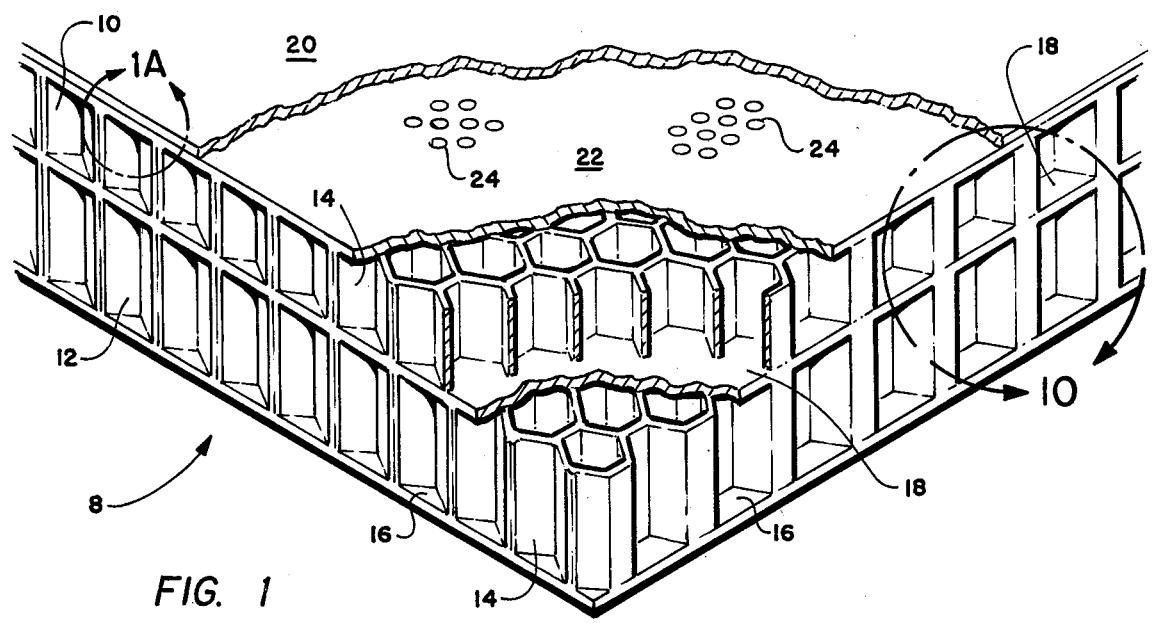
FIG. 1 is a fragmentary, partially cut away perspective of one embodiment of an acoustic panel constructed in accordance with the instant invention.
Figure 10:
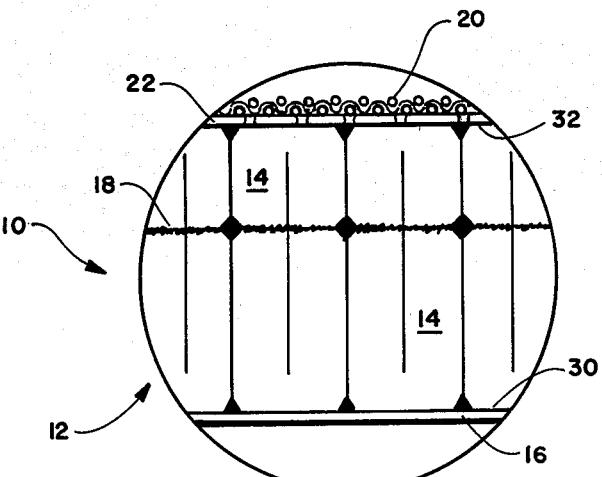
FIG. 10 is an enlarged section taken along line 10—10 of FIG. 1.

Referring now to the drawings in detail and specifically to FIGS. 1 and 10, the reference character 8 generally designates a sound suppression panel embodying the present invention and comprising two honeycomb cores 10 and 12, each having a usual multiplicity of endwise directed cells 14 therein, a relatively thin imperforate facing sheet 16, first and second sheets of microporous material 18 and 20, and a relatively thin perforate facing sheet 22 having a multiplicity of perforations 24 of a preselected cross-sectional area and pattern provided therein.

The honeycomb cores 10 and 12 may be constructed of non-metallic materials, for example, phenolic resin impregnated fiberglass, Nylon ® polyamide, Nomex ® polyamide or the like, or may be constructed of a suitable metal, such as for example, aluminum or other metals generally used in aircraft. Both of the honeycomb cores 10 and 12 need not be made of either a non-metallic material or a suitable metal. It is within the scope of this invention to construct either core 10 or 12 of a suitable non-metallic material and to construct the complementary core of a suitable metal. The microporous material is preferably constructed of stainless steel woven material, metallic fibrous felt or any of a number of various other fabric materials, including graphite, Nylon ®, or the like and is understood to have a porosity rating generally of 5 to 50 microns. A woven material normally referred to as Dutch Twill weave of stainless steel which has a relatively smooth surface compared to a perforated sheet has proven very successful.

As aforementioned, the perforate sheet 22 and the imperforate sheet 16 are generally constructed of metal such as aluminum or the like, known in aircraft construction; however, rigid non-metallic sheets such as high temperature plastics, graphite fiber reinforced plastics and the like could be utilized to practice the invention.

In the event dissimilar metals are used in the construction of the panel 8, it is very important either not to position such dissimilar metals adjacent one another or, in the alternative, to isolate adjacent dissimilar metals from each other to prevent galvanic action therebetween, since it is well known that galvanic action causes bond line delamination. In the construction of the sound suppression panel 8 of the instant invention, it is preferable to use cores 10 and 12, constructed of a non-metallic material aforementioned, with a stainless steel woven microporous material 18 sandwiched therebetween, thus eliminating any galvanic action between the cores and sandwiched microporous sheet 18 due to adjacent dissimilar metals; however, as taught in U.S. Pat. No. 4,254,171, dissimilar metals can be positioned adjacent one another if they are separated or isolated. One means for providing such isolation lies in the choice, thickness, and application of the adhesive used for their bonding together. Other isolation means now known in the art and those developed in the future may also be used.

The facing sheet 22 is perforated with a plurality of small perforations 24; their size, for example, in a common application would preferably range from 0.030 to 0.100 inches in diameter. The perforations 24, appropriately spaced, would thus provide a range of from 15% to 36% or greater open area to the facing sheet 22. The perforations 24 may be punched, drilled, or chem milled through the facing sheet 22. At present, punching is preferred. The perforations may be spaced at 0.081 inch intervals in a typical application and, for example, placed in a triangular pattern. Various other intervals and patterns may be used to successfully practice this invention. The sheet 16 is imperforate and forms a closed surface to the Helmholtz resonator cavities provided by the cores 10 and 12.

The second thin microporous sheet 20 may be adhesively bonded to one surface of the perforate face sheet 22 by means of a first adhesive. The adhesive typically used to bond these components is a suitable adhesive generally consisting of a low solid solvent solution. When the solvent is removed from such a solution by evaporation, the viscosity index is elevated. The adhesive may be applied, for example, as an adhesive film which may be reticulated prior to bonding. In the event the microporous sheet 20 and the perforate face sheet 22 are made from the same material, then the sheet 20 and the sheet 22 may be secured together by means other than adhesive bonding. Examples of such joining methods would include diffusion bonding, resistance welding, etc.

As aforementioned, the preferred microporous material for sheets 18 and 20 is a stainless steel Dutch twill woven material or the like. Other types of materials and weave patterns may also be utilized to successfully practice this invention. In some applications of the sound suppresson panels, a woven material such as the Dutch twill may require that the strand crossover points be joined by methods well known in the art such as sintering, diffusion bonding or the like, as taught in U.S. Pat. No. 4,242,176. At present a non-metallic material for the cores and aluminum for the perforated and imperforate sheets is preferred.

The adhesive coating for bonding the perforate sheet 22 to the microporous material 20 is preferably applied by spraying. The solvent from the adhesive is then removed by evaporation. The surface attraction forces cause the adhesive layer 23 around each perforation 24 of the perforated sheet 22 to take a rounded, funnel-like shape upon removal of the solvent as seen most clearly in FIG. 1A. The substantially solid or highly viscous adhesive 23 now remaining retains this funnel-like shape and later during the cure cycle does not soften and flow but merely becomes sufficiently tacky to adhere to, rather than flow into, the microporous material while maintaining the funnel-like shape.

This inherent behavior of the selected adhesive material effectively enlarges the openings into the perforations 24 at the side opposite the core cells 10 and 12, which provides an enhanced acoustic open area. An example is the use of a perforated sheet 22 having an actual geometric open area of approximately 34% wherein the combination of the noted perforated sheet and microporous material overlay has an effective open area of approximately 42%, an apparent increase of over 10%. This effective increase in open area can only be attributed to the rounded funnel-like openings between the perforations and porous material layer created by the layer of adhesive 23. The thickness of the adhesive layer 23 between the perforated sheet 22 and the layer of microporous material 20 is preferably in the range of 0.001 to 0.004 inches for a typical application.

It has been found that this increased open area effect can be further enhanced by applying a thicker layer of adhesive than normal (for example, in the range of 0.003 to 0.005 inches), removing the solvent as hereinbefore discussed, and then curing the adhesive layer by prolonged exposure to ambient temperature or by elevating the temperature of the perforated sheet 22 with the thick layer of adhesive to a normal cure temperature recommended by the manufacturer, generally in the range of 300°. The thickness of the layer can also be increased by successive thin layers of adhesive with solvent removal and curing between each layer of adhesive. Effective open areas of approximately 50% have been achieved using a sheet of perforate material having an actual open area of approximately 34% as aforementioned. In the buildup/cure method, an additional layer of adhesive is applied and the solvent removed, but left uncured.

The above method of applying a thick coating of adhesive or adhesive buildup with successive curing can also be applied between the cores and the first or inner layer of microporous material 18 to provide increased isolation when dissimilar metals are used for the cores 10 and 12 and the microporous material 18.

Figure 3:
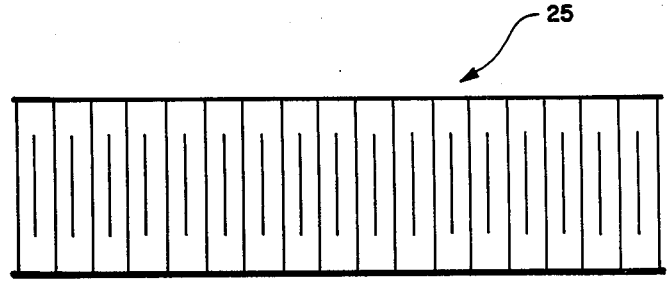
FIG. 3 is a schematic side view of a block of expanded core.

To provide maximum straight load path strength between the cores, the two cores may be cut from the same block 25 of core material, see FIG. 3, and aligned by locator plates 27, one on top of the other, with the microporous material 18 sandwiched therebetween.

When maximum strength is not a requirement, the two cores 10 and 12 may be selected from different or the same sheets of core material and strict alignment is not necessary. Although it would appear that the lining up of the core cells would minimize the amount of pore blockage in sheet 18 associated with the bonding process and provide the greatest possible effective area for noise suppression in the final assembly as compared with non-aligned cells, there does not appear to be a substantial difference in their acoustical properties, hence either selection of the cores providing substantial cell alignment or non-alignment may be employed to practice this invention.

The coating of a second adhesive for bonding the microporous sheet 20 to the cores 10 and 12 and bonding the perforate sheet 22 to the outer cell edges of core 10 is applied to the outer cell edges by any known convenient means, which, by way of example and not by way of limitation, would include reticulate adhesive methods, roller coating, etc. The second adhesive is a typical adhesive, preferably of a non-solvent type, used for adhesively bonding honeycomb core to sheets in aerospace applications.

METHOD OF MANUFACTURE

Figure 1A:
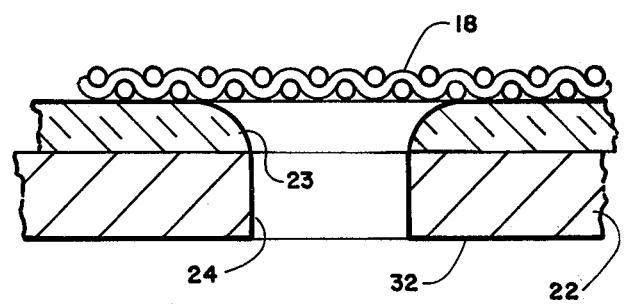
FIG. 1A is a fragmentary side view of the upper portion of the panel of FIG. 1 taken along line 1A in FIG. 1.
Figure 2:
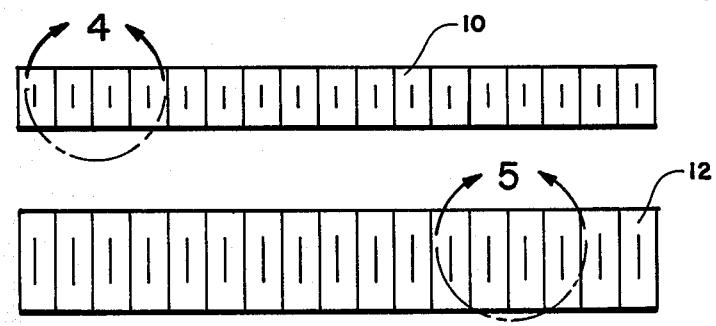
FIG. 2 is a schematic side view of the two cellular cores used in the panel.

Referring now to FIG. 11, a preferred method of manufacture of the panel 8 will be described. A solvent base adhesive 23 is applied to one surface of the perforate sheet 22, as by spraying, and then the solvent is removed to form the funnel shaped opening in the adhesive 23 around each opening 24 as seen in FIG. 1A. The microporous material 20 is then applied to the adhesive coated surface of sheet 22 and the adhesive 23 is cured under appropriate heat and pressure conditions to bond the microporous sheet 20 to the perforate sheet 22. To preclude capillary action permitting the adhesive bonding of the perforate sheet 22 to the core 10, the adhesive is caused to infiltrate laterally into the microporous sheet 18 upon final assembly of the panel 8, and a suitable antiwetting material is applied to the microporous sheet and the side of the perforate sheet 22 to which the material is bonded. A maskant may be applied to the exposed side of the perforate sheet 22 prior to such application but may not be necessary in all instances. The maskant will be removed prior to final assembly of the panel. With respect to the application of such nonwetting material, the teachings of U.S. Pat. Nos. 4,271,219 and 4,291,079 assigned to the assignee of the present application is incorporated by reference.

Figure 4:
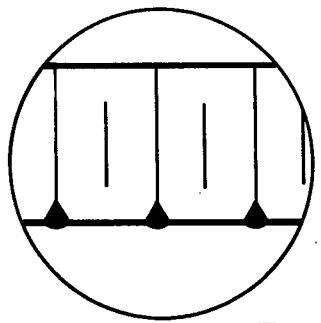
FIG. 4 is an enlarged section of a core taken along line 4—4 of FIG. 2.
Figure 5:
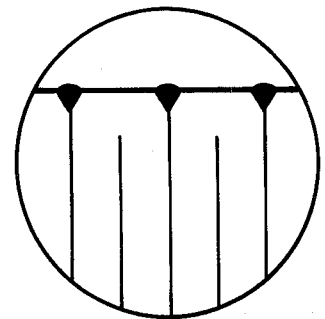
FIG. 5 is an enlarged section of a core taken along line 5—5 of FIG. 2.
Figure 6:
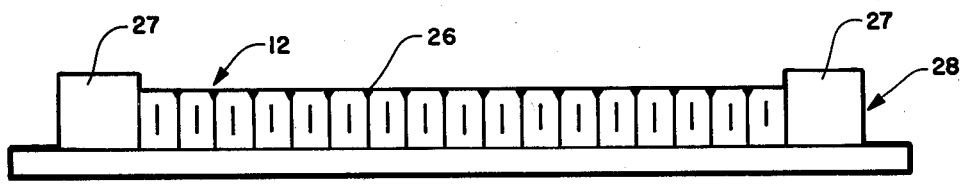
FIG. 6 is a showing of one core placed in a locator plate.
Figure 7:
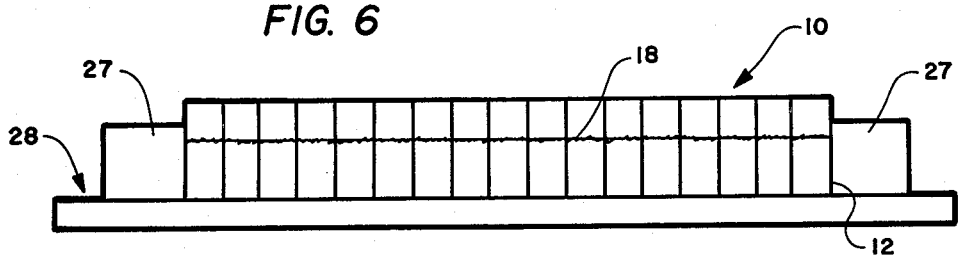
FIG. 7 is a showing of both cores, with a sheet of microporous material sandwiched therebetween, placed in a locator plate.

Either a block of expanded core, as shown in FIG. 3, is cut to provide cores 10 and 12, or two separate pieces of core material 10 and 12 are used. All of the constituent components are thoroughly cleaned and degreased, prior to assembly by any known convenient means. A layer of suitable second adhesive 26 is applied to the adjacent surfaces of the cores 10 and 12 (see FIGS. 4 and 5) as a film for reticulation or by roller coating. One core (core 12 for example) is positioned in an assembly jig 28 with the adhesive coated surface exposed. A sheet of microporous material 18 is interposed thereon. Prior to positioning of such microporous material 18, it is coated also with a suitable anti-wetting agent as hereinbefore described with respect to sheet 20. The adhesive thus provides a mechanical interlock between the adhesive, adhering to the faying edges of the cores 10 and 12 and the strands of the microporous woven wire mesh material 18. The other core (core 10 for example) is then placed, adhesive side down, on the microporous material 18. Pressure is then applied between the cores 10 and 12 toward the microporous material 18 and the adhesive is cured in a known conventional manner. The jig provides for cell alignment between the cores when desired or required.

Figure 8:
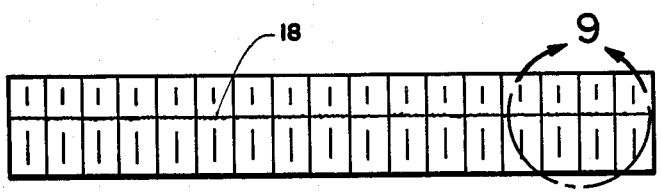
FIG. 8 is a showing of the two cores with the microporous material sandwiched therebetween in a joined state.
Figure 9:
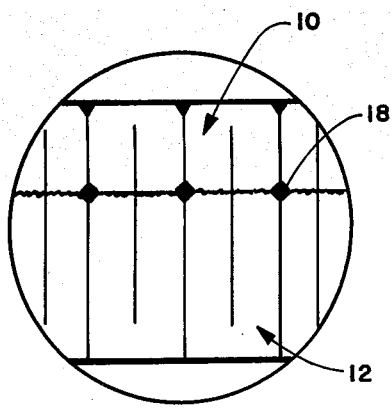
FIG. 9 is an enlarged section taken along line 9—9 of FIG. 8.

After the adhesive 26 on the adjacent cores 10 and 12 and microporous material 18 is cured, if desired, the flow-through resistance of that combination as well as that of the combination of the microporous sheet 20 and perforate sheet 22 can be tested to ensure that the resistance is at a desirable level to satisfy acoustic requirements. This testing is done by conventional known means. After this testing is accomplished, a layer of the second adhesive 26 is applied to one surface of the imperforate sheet 16 and to the perforated exposed surface 32 of the flow-through, resistance tested, pre-combined perforated sheet 22 and microporous material 20 or the faying surfaces of the cells of honeycomb cores to which they are applied. The components are then stacked or as shown in FIGS. 1 and 8, namely, the microporous material 18 is sandwiched between the two cores 10 and 12 and the cores 10 and 12 are sandwiched between the imperforate sheet 16 and the porous material-covered perforated sheet 22. Pressure is now applied to the entire assembly of components from the outer surfaces toward the center by convenient means such as, but not limited to, a mechanical press or autoclave. The adhesive is then allowed to cure under appropriate temperature and pressure conditions for the particular adhesive 26 chosen. After curing, the noise suppression panel 8 may be sized or formed to end use requirements.

Although the foregoing invention has been described in some detail by way of illustration and example, for the purpose of clarity of understanding, it should be understood that certain changes and modifications may be practiced within the spirit of the invention as limited only the the scope of the claims. For example, the microporous material 20 may be bonded to the sheet 22 other than by adhesive bonding if the material 20 and the sheet 22 are not dissimilar materials. Also, although a simplified flow chart has been shown in FIG. 11, it should be clearly understood that it is exemplary and that the order of the steps may be varied as well as other changes may be made and yet remain within the scope of the present invention.

What is claimed as new and useful and desired to be secured by U.S. Letters Patent is:

1. A double layer noise suppression honeycomb sandwich panel having structural strength for use in severe environments in and around high velocity fluid flow paths associated with aircraft gas turbine engines and providing a predetermined flow through resistance to satisfy acoustical requirements comprising:
    (a) first and second non-metallic honeycomb cores, each having a multiplicity of endwise directed cells formed with walls of thin sheet material disposed transversely to the panel, said walls terminating in a pair of cell edges, the cell edges on one side of each said honeycomb core facing the cell edges on one side of the other honeycomb core;

(b) a first thin sheet of metallic microporous material positioned between the first and second honeycomb cores and adhesively bonded to the endwise facing cell edges of said honeycomb cores;

(c) a perforated facing of thin sheet material having two surfaces, one of said surfaces being adhesively bonded to the endwise cell edge of said first honeycomb core opposite said first thin sheet of microporous material;

(d) a second thin sheet of microporous material bonded to the other surface of said perforated facing of thin sheet material whereby air is permitted to enter the noise suppression panel and a relatively smooth outer surface is presented to a high velocity fluid flow; and (e) an impervious facing of thin sheet material adhesively bonded to the endwise cell edge of said second honeycomb core opposite said first sheet of microporous sheet material.

2. The invention as defined in claim 1 wherein the cells of said first and second cores are in substantial alignment.

3. The invention as defined in claim 1 wherein the cells of said first and second honeycomb cores are misaligned.

4. The invention as defined in claim 1 wherein at least one honeycomb core is constructed of phenolic epoxy impregnated material.

5. The invention as defined in claim 1 wherein said honeycomb cores are constructed of phenolic epoxy impregnated material selected from the class consisting of fiberglass, Nylon ® polyamide or Nomex ® polyamide and said sheets of microporous material are constructed of steel.

6. The invention as defined in claim 1 wherein the second thin sheet of microporous material is adhesively bonded to the perforated facing of sheet material.

7. The invention as defined in claim 1 wherein the second thin sheet of microporous material and the perforate sheet are made from the same material.

8. The invention as defined in claim 1 wherein said imperforate and perforated facing sheets are constructed of aluminum.

9. The invention as defined in claim 1 wherein said microporous material is woven steel cloth.

10. The invention as defined in claim 1 wherein said imperforate and perforated facing sheets are constructed of graphite fiber reinforced plastic.

11. The invention as defined in claim 4 wherein said microporous material is woven steel cloth.

12. The invention as defined in claim 2 wherein the second thin sheet of microporous material and the perforate sheet are made from the same material.

13. The invention as defined in claim 2 wherein said imperforate and perforated facing sheets are constructed of aluminum.

14. The invention as defined in claim 12 wherein said imperforate and perforated facing sheets are constructed of aluminum.

* * * * *